(12) United States Patent
Lee

(10) Patent No.: US 9,143,040 B2
(45) Date of Patent: Sep. 22, 2015

(54) HOLD-UP TIME ENHANCEMENT CIRCUIT FOR LLC RESONANT CONVERTER

(71) Applicant: Tai Keung Lee, Hong Kong (HK)

(72) Inventor: Tai Keung Lee, Hong Kong (HK)

( * ) Notice: Subject to any disclaimer, the term of this patent is extended or adjusted under 35 U.S.C. 154(b) by 0 days.

(21) Appl. No.: 14/195,506

(22) Filed: Mar. 3, 2014

(65) Prior Publication Data

US 2014/0247626 A1   Sep. 4, 2014

Related U.S. Application Data

(63) Continuation of application No. 13/860,698, filed on Apr. 11, 2013, now abandoned.

(60) Provisional application No. 61/622,862, filed on Apr. 11, 2012.

(51) Int. Cl.
*H02M 3/335* (2006.01)
*H02M 1/00* (2007.01)

(52) U.S. Cl.
CPC ........ *H02M 3/33523* (2013.01); *H02M 3/3353* (2013.01); *H02M 3/33507* (2013.01); *H02M 2001/0096* (2013.01); *Y02B 70/1433* (2013.01)

(58) Field of Classification Search
CPC ................. H02M 2001/0096; H02M 3/33553; H02M 3/3385; H02M 3/33523
USPC ......................................................... 363/16
See application file for complete search history.

(56) References Cited

U.S. PATENT DOCUMENTS

| | | | | |
|---|---|---|---|---|
| 2004/0004848 A1* | 1/2004 | Yuzurihara et al. | ............. | 363/16 |
| 2004/0156217 A1* | 8/2004 | Phadke | ...................... | 363/21.16 |
| 2009/0244944 A1* | 10/2009 | Jang et al. | ...................... | 363/126 |
| 2009/0290384 A1* | 11/2009 | Jungreis | .......................... | 363/17 |
| 2013/0194831 A1* | 8/2013 | Hu | .............................. | 363/21.01 |

* cited by examiner

*Primary Examiner* — Harry Behm
(74) *Attorney, Agent, or Firm* — Harness, Dickey & Pierce, P.L.C.

(57) ABSTRACT

An open loop half-bridge LLC power converter includes circuitry to reliably increase hold-up time without sacrificing efficiency. An LLC resonant circuit includes resonant inductance, a primary transformer winding, and resonant capacitance. An auxiliary circuit includes an auxiliary transformer winding, an inductor, and a third switching element coupled in series. A controller is coupled across a voltage sensor and effective thereby to determine a holdup time condition. In a "normal" operating condition the controller generates switch driver signals to turn OFF the third switching element and disable the auxiliary circuit, and in a hold-up time condition the controller turns ON the third switching element and enables the auxiliary circuit wherein the output voltage is increased via current supplied from the auxiliary winding. In various embodiments the auxiliary winding may be an auxiliary primary or secondary, or a secondary to an auxiliary primary winding of a second transformer.

21 Claims, 8 Drawing Sheets

HOLD-UP TIME ENHANCEMENT CIRCUIT FOR LLC RESONANT CONVERTER

CROSS-REFERENCES TO RELATED APPLICATIONS

This application is a continuation of U.S. patent application Ser. No. 13/860,698 filed Apr. 11, 2013, and claims the benefit of U.S. Provisional Application No. 61/622,862 filed Apr. 11, 2012. The entire disclosures of the above applications are incorporated herein by reference.

BACKGROUND OF THE INVENTION

The present invention relates generally to power converters. More particularly, the present invention relates to gain enhancement circuitry for LLC resonant power converters wherein a hold-up time may be increased with minimal effect on efficiency.

As market requirements for high efficiency have become more demanding, LLC resonant converters have correspondingly grown in popularity due to their high efficiency performance and their ability to achieve high power density. The 80 Plus Platinum certification standard requires greater than 94% efficiency at half load (50%) conditions. The 80 Plus Titanium standard requires 96% efficiency at half load conditions.

However, there is a trade-off between the high efficiency and long hold-up time performance in a resonant converter. Generally speaking, the hold-up time of a converter is the amount of time (typically in milliseconds) that a power converter can continue to generate output within a specified range after an input power interruption. Efficiency can be increased significantly with, for example, an increase in magnetizing inductance to reduce switching losses. However, the hold-up time will consequently decrease by a significant amount as well. And likewise, efficiency may be sacrificed for long hold-up time performance.

One solution that is known in the art for maintaining high efficiency performance while achieving long hold-up time is to increase the bulk capacitance. However, this results in problems of low power density and also higher cost.

It would therefore be desirable to provide power converters with circuitry for balancing high efficiency and long hold-up time, while addressing the power density issues which would otherwise result from solutions in power converters as are presently known to those of skill in the art.

BRIEF SUMMARY OF THE INVENTION

An open loop half-bridge LLC resonant power converter according to one aspect of the present invention includes circuitry to reliably increase hold-up time without increasing bulk capacitance or sacrificing efficiency.

In an exemplary embodiment, an LLC resonant circuit includes resonant inductance, a primary transformer winding, and resonant capacitance. An auxiliary circuit includes an auxiliary transformer winding, an inductor, and a third switching element coupled in series. A controller is coupled across a voltage sensor and effective thereby to determine a holdup time condition. In a "normal" operating condition the controller generates switch driver signals to turn OFF the third switching element and disable the auxiliary circuit, and in a hold-up time condition the controller turns ON the third switching element and enables the auxiliary circuit.

Generally stated, when the auxiliary circuit is enabled, current flows through the second inductor and the current is further coupled to the main transformer, wherein the gain of the resonant converter is increased and the output voltage maintained for a lower bulk voltage. Hence, increasing the hold-up time and maintaining high efficiency is achieved without requiring a larger, more expensive bulk capacitor in accordance with an objective of the present invention.

In some embodiments the auxiliary winding may be an auxiliary primary winding of the transformer.

In other embodiments the auxiliary winding may be an auxiliary secondary winding of the transformer.

In still other embodiments the converter may further include a second transformer having a primary winding coupled in parallel with the primary winding of the first transformer, and the auxiliary winding of the hold-up circuit may be an auxiliary primary winding of the second transformer.

DETAILED DESCRIPTION OF THE INVENTION

Figure 1:
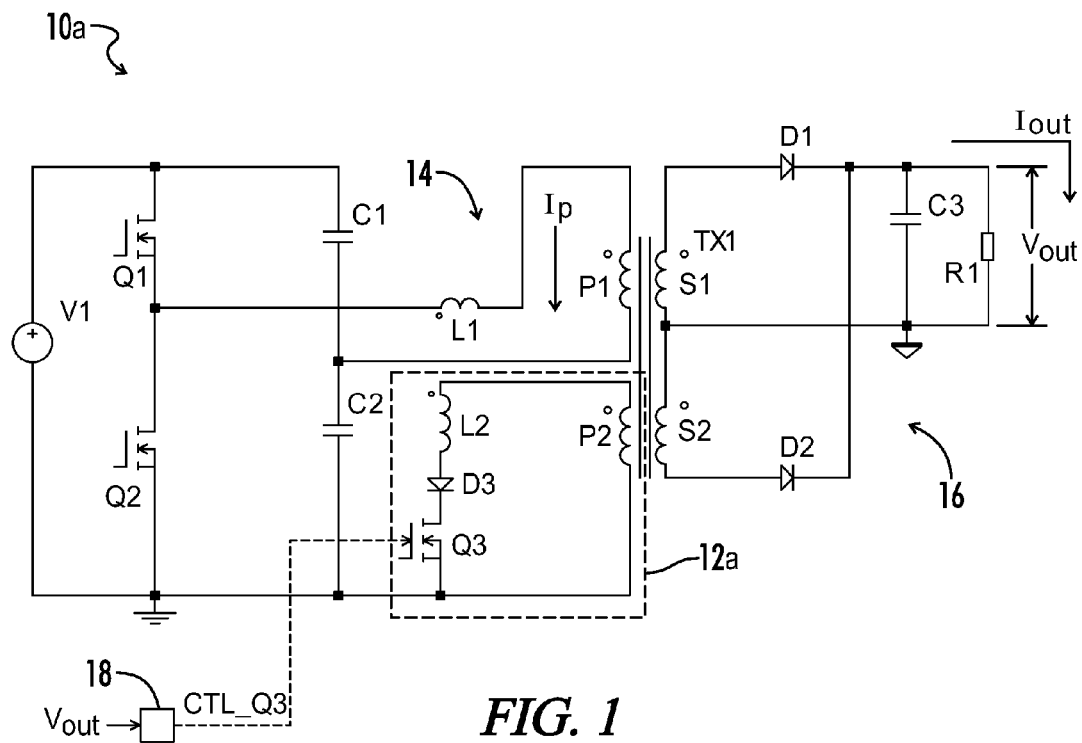
FIG. 1 is a circuit block diagram representing an exemplary LLC resonant converter with a first embodiment of a gain enhancement circuit according to the present invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The term "signal" as used herein may include any meanings as may be understood by those of ordinary skill in the art, including at least an electric or magnetic representation of current, voltage, charge, temperature, data or a state of one or more memory locations as expressed on one or more transmission mediums, and generally capable of being transmitted, received, stored, compared, combined or otherwise manipulated in any equivalent manner.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The terms "controller," "control circuit" and "control circuitry" as used herein may refer to a processor-readable and non-transitory medium such as may be embodied by or included within a general microprocessor, application specific integrated circuit (ASIC), microcontroller, or the like as may be designed and programmed to cause specific functions as further defined herein to be performed upon execution by a processing unit, either alone or in combination with a field programmable gate array or various alternative blocks of discrete circuitry as known in the art.

Referring generally to FIGS. 1-11, various embodiments of an LLC resonant power converter with hold-up time enhancement circuitry according to the present invention may now be described. Where the various figures may describe embodiments sharing various common elements and features with other embodiments, similar elements and features are given the same reference numerals and redundant description thereof may be omitted below.

For example, each of FIGS. 1-11 refer generally to a common configuration for an LLC resonant power converter 10, with the individual figures referring more particularly to embodiments that vary depending on the position and configuration of a hold-up time enhancement circuit 12 according to the present invention. Generally stated, an exemplary such power converter 10 may include a power source V1 which may typically be, for example, the output from a power factor correction (PFC) circuit, but may be any form of DC input as would be known to those of skill in the art. At least a first pair of switching elements Q1, Q2 are coupled in series across the input power terminals of the power source V1 to define a half bridge configuration. An LLC resonant circuit 14 is defined by a resonant inductor L1, a magnetizing inductance in the primary winding P1 of a main transformer TX1, and resonant capacitors C1, C2.

An output circuit 16 may be defined by secondary windings S1, S2 of the main transformer TX1. Opposing ends of the secondary windings S1, S2 are coupled via diodes D1, D2 to a first end of output capacitor C3 defining a first output terminal. A center tap between the secondary windings S1, S2 is coupled to a second end of the output capacitor C3 defining a second output terminal. Other configurations of the output circuit 16 may certainly be contemplated within the scope of the present invention, but the center tapped winding configuration may be desirable to increase the efficiency of the converter.

A voltage sensor R1 is coupled to a controller 18 whereby the controller may monitor an appropriate status of the power converter and determine the presence of a hold-up time condition. The sensor R1 may be positioned in any of various locations throughout the power converter circuit 10, whether proximate the output circuit, the input power source, or the like, and may further take various forms. As but one alternative example, an output inductor (not shown) may be coupled along the first branch of the output circuit between the diode D1 and the output capacitor C3, with nodes on opposing sides of the output inductor being coupled to the controller via, for example, a resistive network.

Referring more particularly now to FIG. 1, in a particular embodiment of the power converter 10a according to the present invention, a hold-up time enhancement circuit 12a includes an auxiliary primary winding P2, an auxiliary inductor L2, a diode D3 and an auxiliary switching element Q3 coupled in series. The auxiliary switching element Q3 is driven on and off by signals provided from the controller 18.

During a normal condition (i.e., wherein the input power is ON or as may for example be determined by comparison of the input voltage to a predetermined threshold), the controller 18 turns off (or maintains off) the auxiliary switching element Q3, either by disabling control signals to the gate of the switching element Q3 or by reducing the magnitude of the control signals to below the internal threshold for the switch Q3.

However, when there is a temporary failure in the input power source, or any equivalent condition that would prompt the voltage across the bulk capacitor to drop (e.g., below the predetermined threshold), the controller 18 is programmed to thereby identify the presence of a hold-up time condition, and subsequently generates control signals to turn on the auxiliary switching element Q3.

Alternatively, the controller 18 may continuously provide drive signals to the auxiliary switching element Q3, the drive signals of a voltage corresponding inversely to the detected signals from the voltage sensor. The auxiliary switching element Q3 is only turned on when its gate-source voltage exceeds the internal threshold voltage for the switch Q3, which may correspond by design approximately to the desired point based on the voltage drop across the bulk capacitor.

The auxiliary winding P2 is coupled with voltage from primary winding P1 having a value approximately proportional to the turn ratio of P2 and P1. When the auxiliary switching element Q3 is turned on, this voltage acts on the auxiliary inductor L2 and a current sourced through the auxiliary inductor L2 is further coupled to the primary winding P1. The additional current on the primary winding increases P1 the gain of the LLC resonant converter, and the output voltage is maintained for an extended hold-up time.

Figure 2:
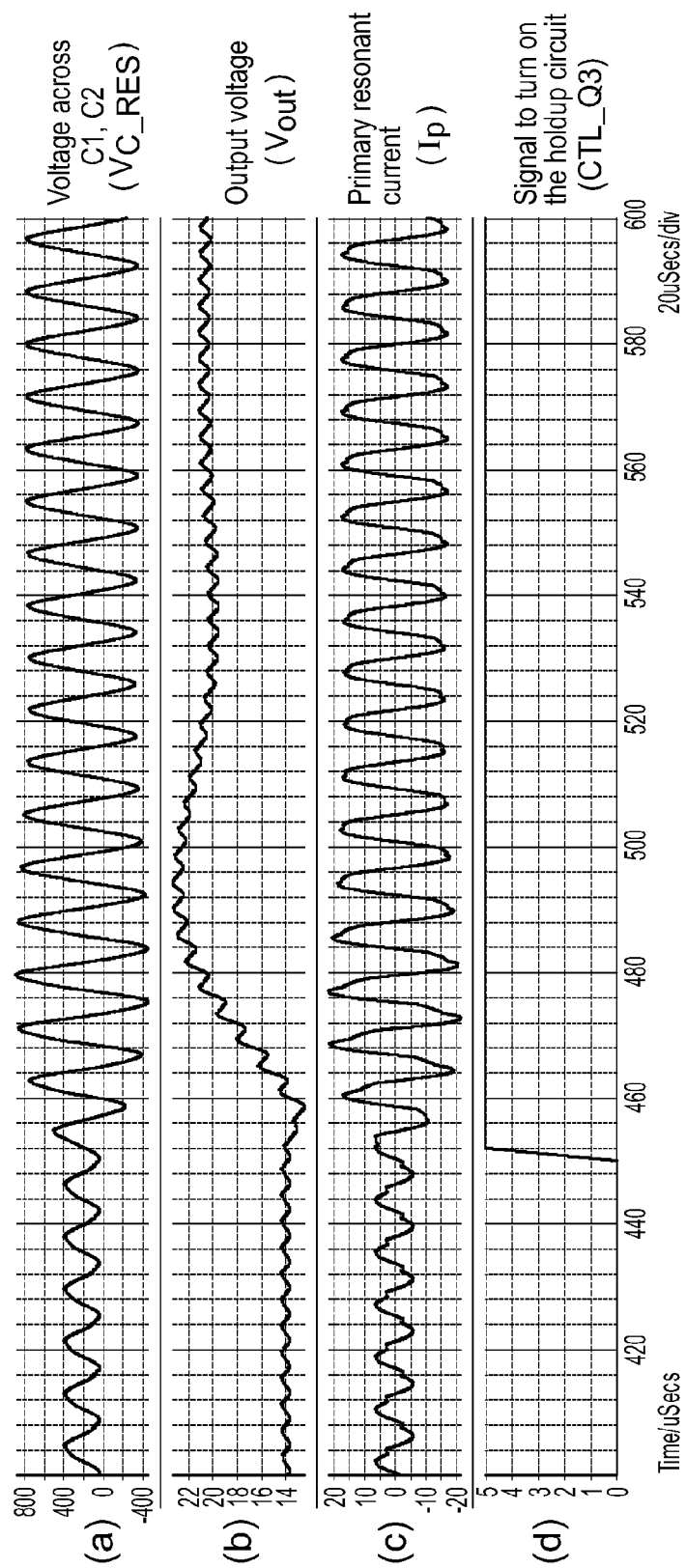
FIGS. 2(a), 2(b), 2(c), 2(d) are graphical illustrations representing exemplary results from a simulation performed on the embodiment of FIG. 1.

Referring generally to the graphical diagrams represented in FIG. 2, an exemplary operation of the embodiment in FIG. 1 is now described. Component values may be as follows:
- resonant inductance (L1)=27 uH;
- resonant capacitance (C1, C2)=22 nF
- main transformer (TX1)=gapped to 150 uH;
- turn ratio for main transformer (TX1)=P1:P2:S1:S2=15:5:1:1;
- output voltage (Vout)=14V
- output current/load (Iout)=55 A When the signal CTL_Q3 is provided in FIG. 2(d), it may be demonstrated that the primary resonant current Ip increases and the voltage swing across the resonant capacitors Vc_res becomes larger. Hence, the total converter gain is boosted and a longer hold-up time is achieved. Note that the output voltage Vout further increased from 14V to 20V in this exemplary operation.

In various embodiments as described herein, it may be further possible to boost converter efficiency by increasing the magnetization inductance to reduce switching losses on the auxiliary switching element Q3.

Figure 3:
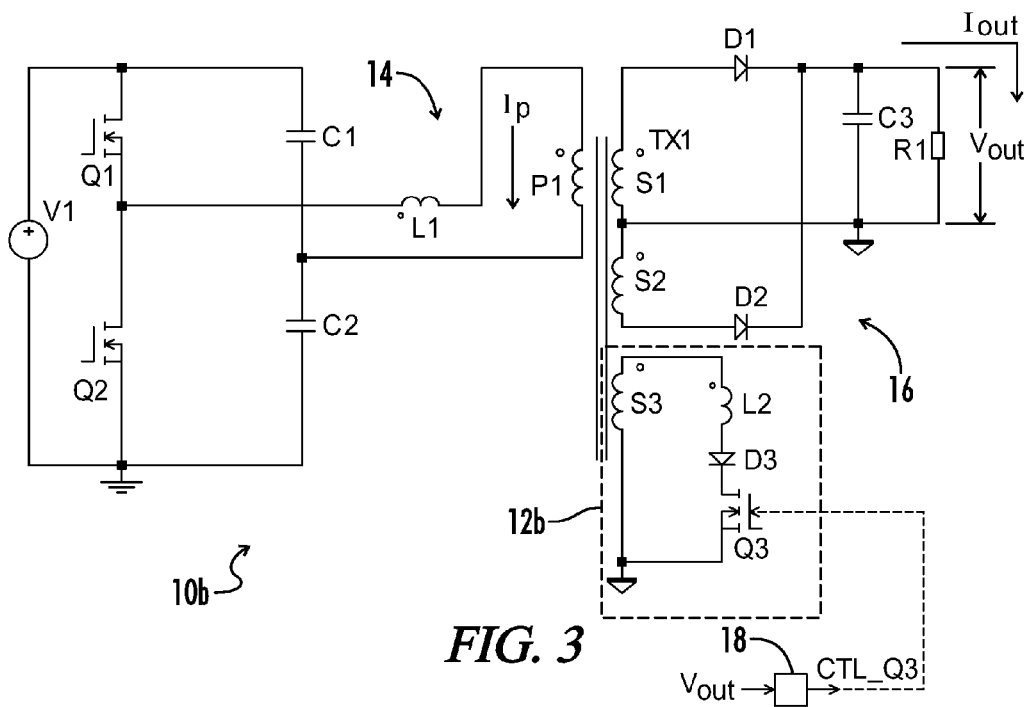
FIG. 3 is a circuit block diagram representing the exemplary LLC resonant converter of FIG. 1 with a second embodiment of a gain enhancement circuit according to the present invention.

In another exemplary embodiment of the LLC converter 10b as represented in FIG. 3, a hold-up time enhancement circuit 12b of the present invention may alternatively be located on the secondary side of the circuit. More particularly, the auxiliary winding may alternatively be an auxiliary secondary winding S3. Otherwise, the configuration and operation of the embodiment 10b of FIG. 3 would be substantially identical to that of the embodiment 10a of FIG. 1 and as described in more detail above.

Figure 4:
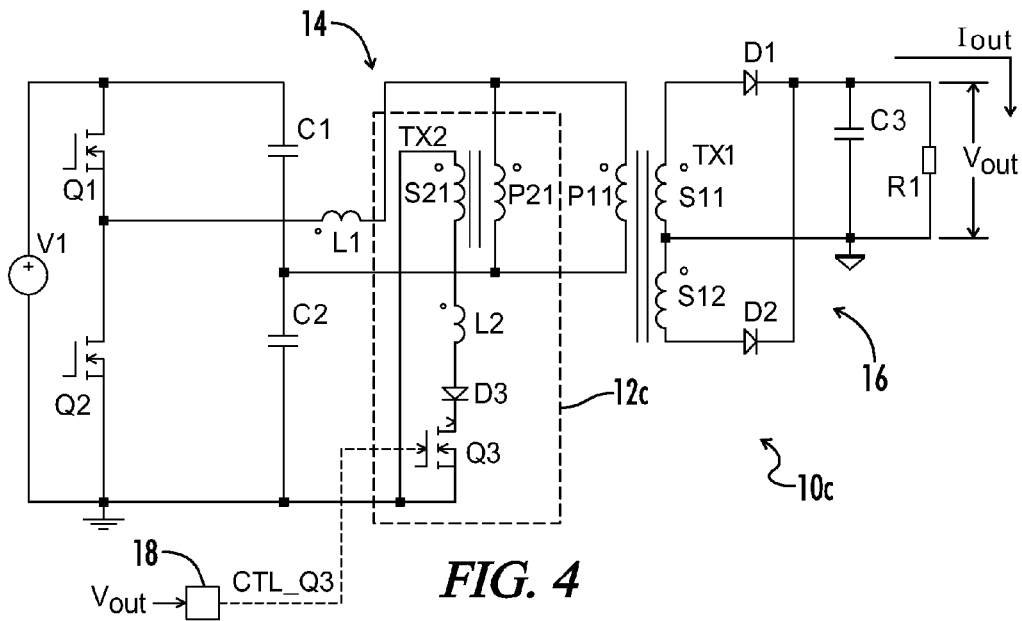
FIG. 4 is a circuit block diagram representing the exemplary LLC resonant converter of FIG. 1 with a third embodiment of a gain enhancement circuit according to the present invention.

In another exemplary embodiment of the LLC converter 10c as represented in FIG. 4, a hold-up time enhancement circuit 12c of the present invention may be coupled to a second transformer TX2. A primary winding P21 of the second transformer TX2 is a magnetizing inductance coupled in parallel with the magnetizing inductance of the primary winding P11 of the first transformer TX1, and an auxiliary winding of the hold-up time enhancement circuit 12c is a secondary winding S21 with respect to the primary winding P21. Otherwise, the configuration and operation of the embodiment 10c of FIG. 4 would be substantially identical to that of the embodiment 10a of FIG. 1 and as described in more detail above.

Figure 5:
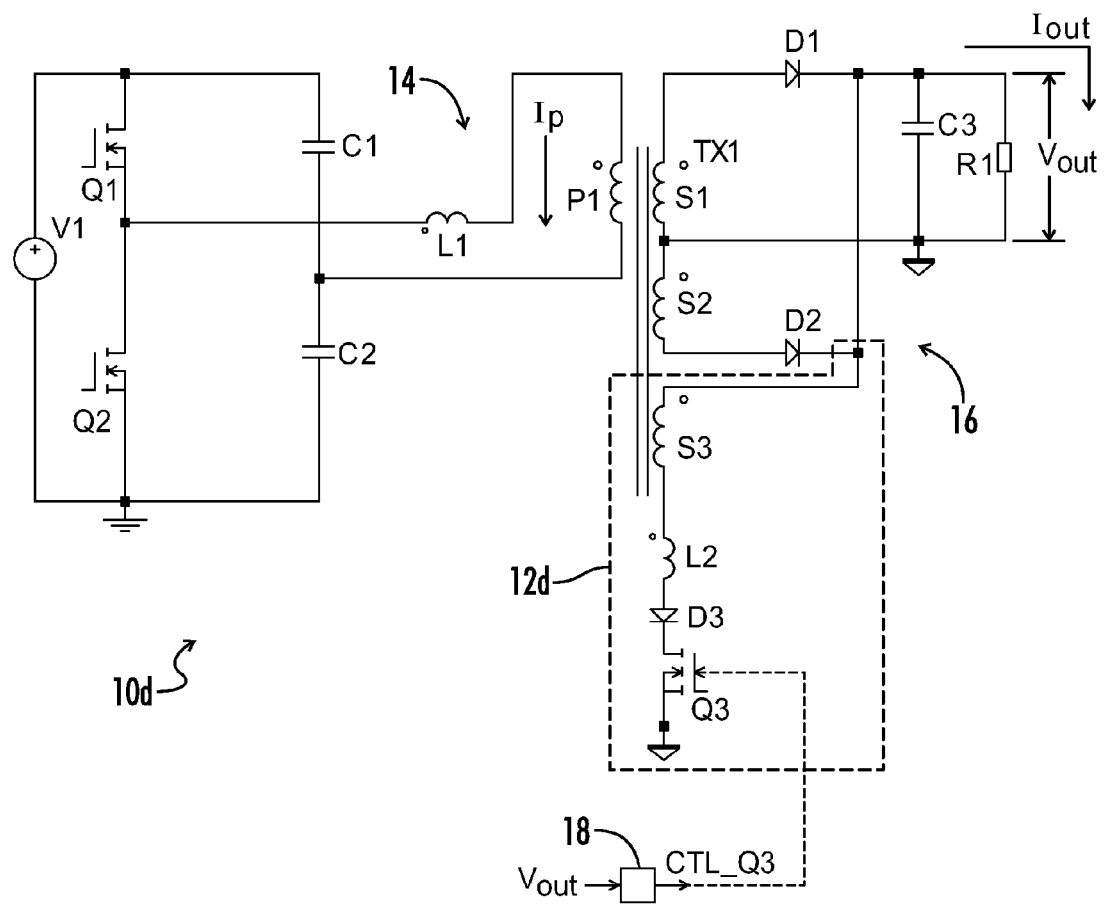
FIG. 5 is a circuit block diagram representing the exemplary LLC resonant converter of FIG. 1 with a fourth embodiment of a gain enhancement circuit according to the present invention.

In another exemplary embodiment of the LLC converter 10d as represented in FIG. 5, a hold-up time enhancement circuit 12d of the present invention may be located on the secondary side of the circuit in similar fashion to that of the embodiment 10b in FIG. 3, wherein the auxiliary winding may be an auxiliary secondary winding S3, but one end of the auxiliary winding S3 is now coupled to the output voltage rather than to the secondary ground, or otherwise stated is now coupled to a first output voltage terminal rather than a second output voltage terminal as in FIG. 3. Otherwise, the configuration and operation of the embodiment 10d of FIG. 5 would be substantially identical to that of the embodiment 10a of FIG. 1 and as described in more detail above.

Figure 6:
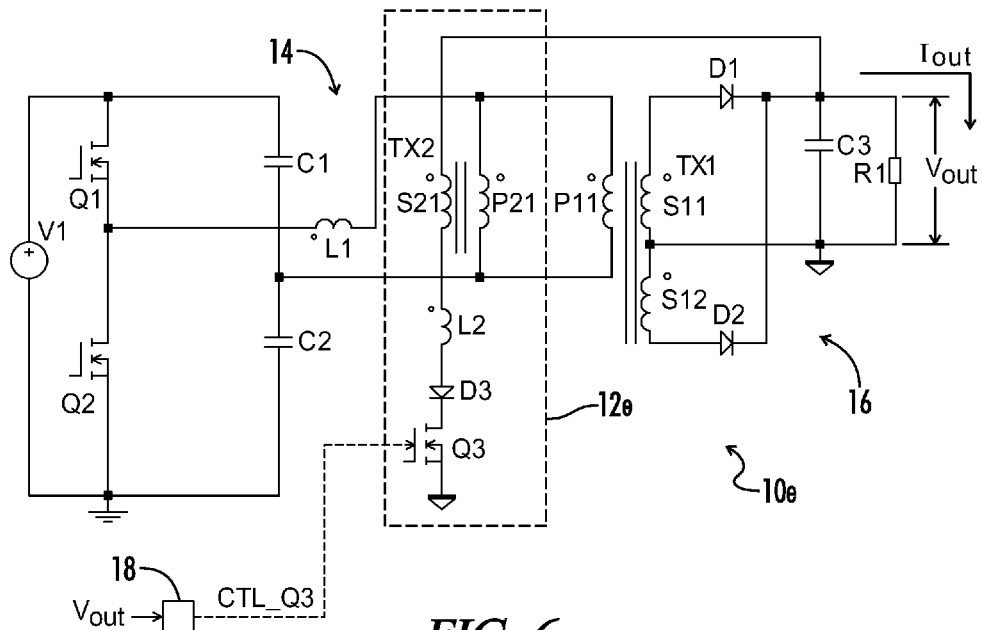
FIG. 6 is a circuit block diagram representing the exemplary LLC resonant converter of FIG. 1 with a fifth embodiment of a gain enhancement circuit according to the present invention.

In another exemplary embodiment of the LLC converter 10e as represented in FIG. 6, a hold-up time enhancement circuit 12e of the present invention may be coupled to a second transformer TX2 in similar fashion to that of embodiment 12c in FIG. 4, wherein a primary winding P21 of the second transformer TX2 is a magnetizing inductance coupled in parallel with the magnetizing inductance of primary winding P11 of the first transformer TX1, and an auxiliary winding of the hold-up time enhancement circuit 12e is a secondary S21 with respect to the primary winding P21. The primary difference of note is that one end of the auxiliary winding S21 is coupled to the output voltage rather than to primary circuit ground as in FIG. 4. Otherwise, the configuration and operation of the embodiment 10c of FIG. 4 would be substantially identical to that of the embodiment 10a of FIG. 1 and as described in more detail above.

Figure 7:
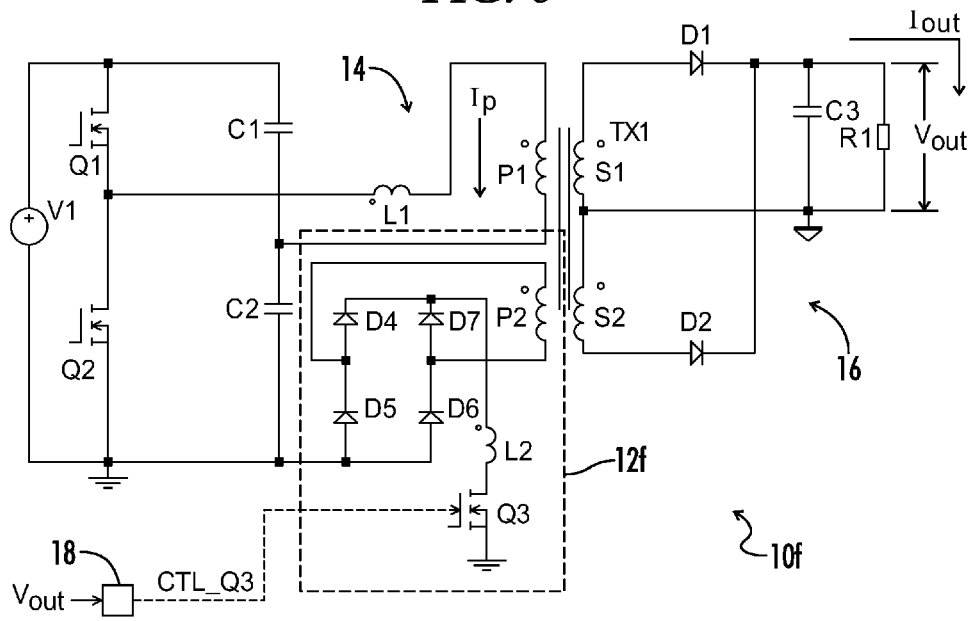
FIG. 7 is a circuit block diagram representing the exemplary LLC resonant converter of FIG. 1 with a sixth embodiment of a gain enhancement circuit according to the present invention.

Referring now to FIG. 7, an embodiment of the hold-up time enhancement circuit 12f may be positioned again in the primary side of the circuit, but now including a diode bridge D4, D5, D6, D7 coupled between the auxiliary winding P2 and the auxiliary switching element Q3.

Figure 8:
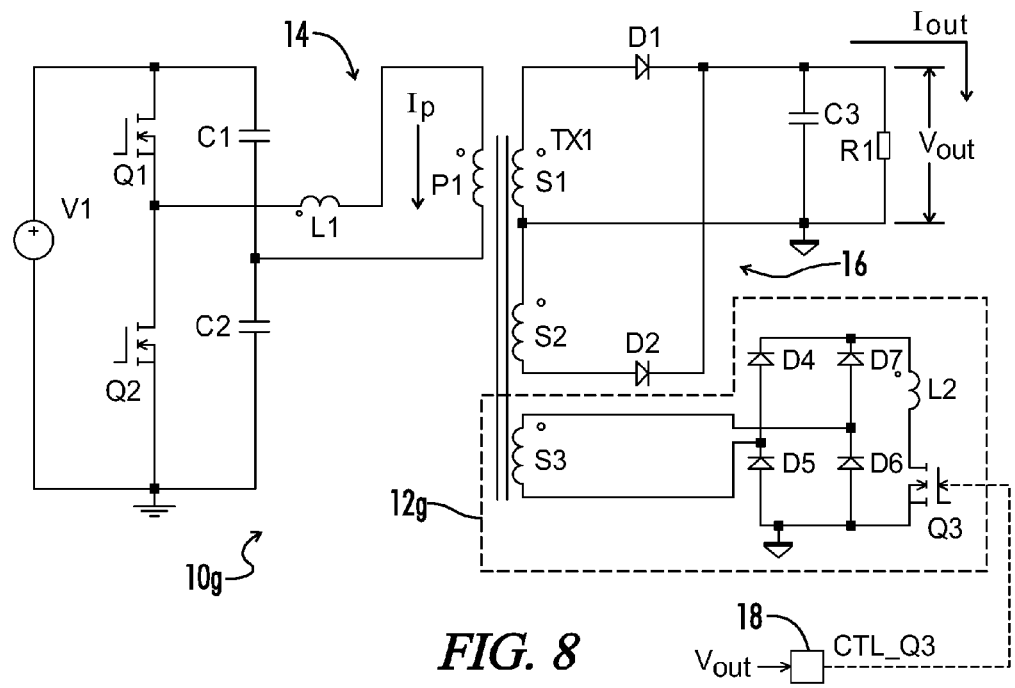
FIG. 8 is a circuit block diagram representing the exemplary LLC resonant converter of FIG. 1 with a seventh embodiment of a gain enhancement circuit according to the present invention.

Referring to FIG. 8, another embodiment of the hold-up time enhancement circuit 12g may have substantially the same configuration as that of FIG. 7, with the exception of the circuit 12g being positioned on the secondary side of the main transformer TX1.

Figure 9:
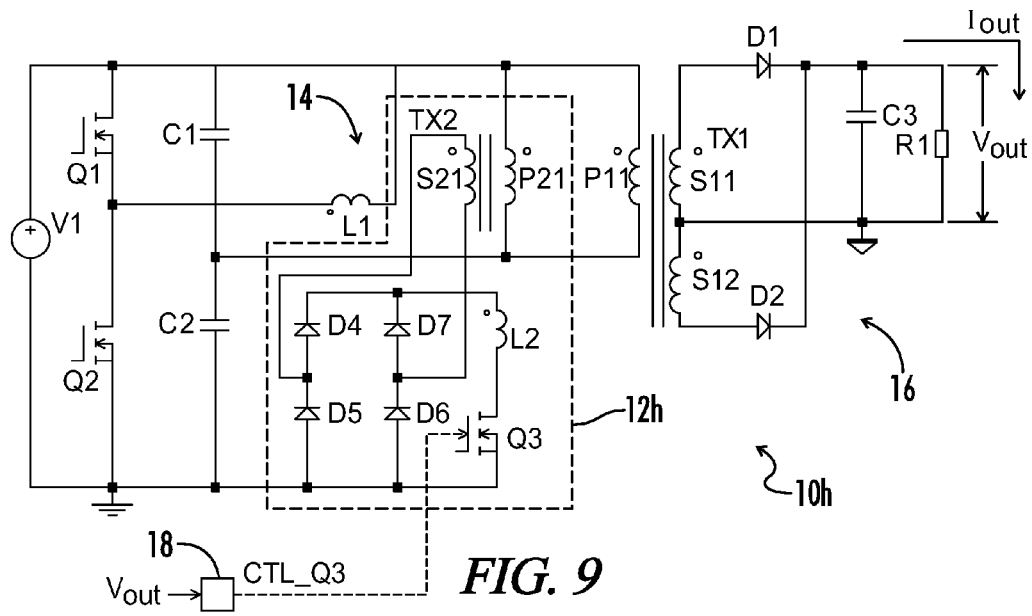
FIG. 9 is a circuit block diagram representing the exemplary LLC resonant converter of FIG. 1 with an eighth embodiment of a gain enhancement circuit according to the present invention.

Referring to FIG. 9, another embodiment of the hold-up time enhancement circuit 12h may have substantially the same configuration as that of FIG. 7, with the exception of the circuit 12h being positioned with respect to a second transformer TX2.

Figure 10:
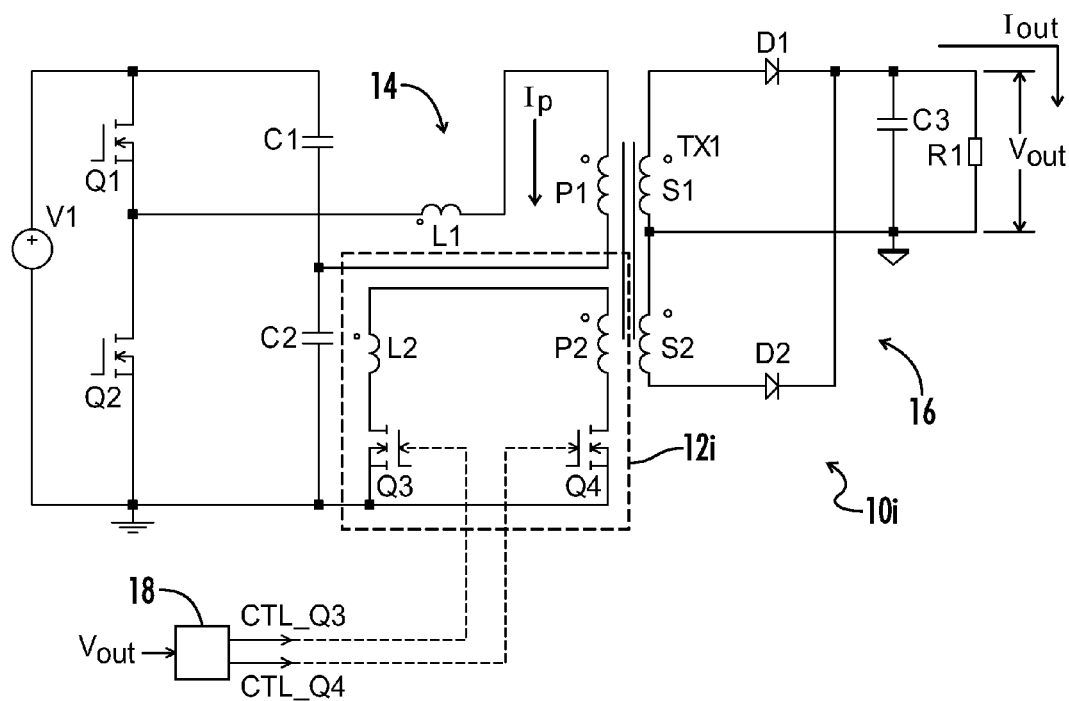
FIG. 10 is a circuit block diagram representing the exemplary LLC resonant converter of FIG. 1 with a ninth embodiment of a gain enhancement circuit according to the present invention.

Referring to FIG. 10, another embodiment of the hold-up time enhancement circuit 12i may include first and second auxiliary switching elements Q3, Q4. The controller 18 provides control signals to each of the auxiliary switching elements Q3, Q4 during a hold-up time condition to perform substantially the same operation as in the configurations described above, namely, sourcing current through the auxiliary inductor L2 to provide such current to the primary winding P1 and further to generate a higher output voltage Vout.

Figure 11:
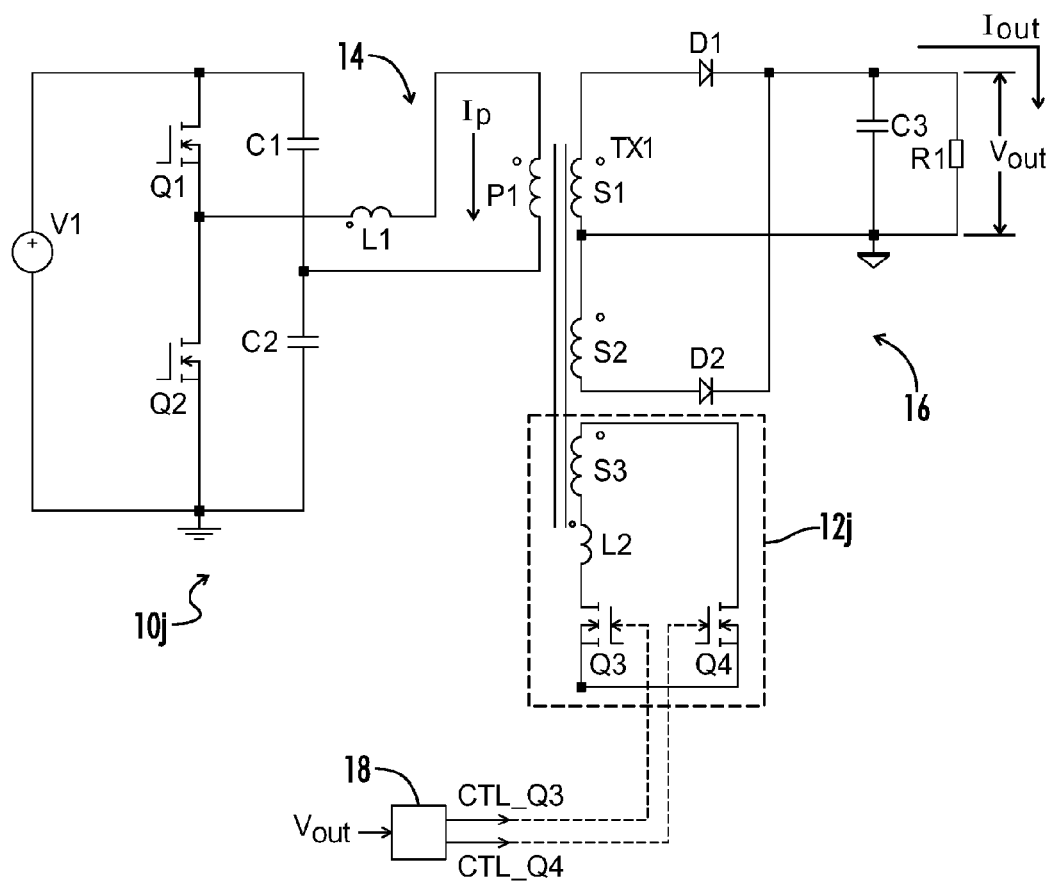
FIG. 11 is a circuit block diagram representing the exemplary LLC resonant converter of FIG. 1 with a tenth embodiment of a gain enhancement circuit according to the present invention.

The embodiment of a hold-up time enhancement circuit 12j as represented in FIG. 11 is substantially the same as the embodiment 12i in FIG. 11, except that it is now positioned in the secondary side of the circuit 10j.

The previous detailed description has been provided for the purposes of illustration and description. Thus, although there have been described particular embodiments of the present invention of a new and useful "Hold-up Time Enhancement Circuit for LLC Resonant Converter," it is not intended that such references be construed as limitations upon the scope of this invention except as set forth in the following claims.

The invention claimed is:

1. A power conversion system comprising: first and second switching elements coupled in series across first and second power input terminals; an LLC resonant circuit coupled between the first and second switching elements and comprising a first inductor, a primary winding of a transformer, and one or more resonant capacitors; an output circuit comprising one or more secondary transformer windings and a bulk capacitor coupled across first and second output terminals; a voltage sensor; a hold-up time enhancement circuit comprising an auxiliary primary winding of the transformer, a second inductor coupled on a first end to the auxiliary primary winding, and a third switching element coupled to a second end of the second inductor; a controller coupled to the voltage sensor and effective to determine a hold-up time condition based on a voltage across the voltage sensor; wherein the controller is further effective in a first operating mode associated with a normal condition to generate switch driver signals to turn OFF the third switching element and disable the hold-up time enhancement circuit; and the controller is further effective in a second operating mode associated with a hold-up time condition to generate switch driver signals to turn ON the third switching element and enable the hold-up time enhancement circuit wherein an output voltage across the first and second output terminals is increased via current supplied from the auxiliary primary winding.

2. The system of claim 1, wherein the auxiliary primary winding is coupled on a second end to circuit ground, and wherein the third switching element is coupled on a first end to the second inductor and on a second end to circuit ground.

3. The system of claim 2, further comprising a fourth switching element coupled between the second end of the auxiliary primary winding and circuit ground.

4. The system of claim 2, the hold-up time enhancement circuit further comprising a diode having an anode coupled to the second end of the second inductor and a cathode coupled to the first end of the third switching element.

5. The system of claim 1, the hold-up time enhancement circuit further comprising first and second diodes in each of first and second branches of a diode bridge, wherein the anodes of each of the first diodes are coupled to circuit ground, the cathodes of each of the second diodes are coupled to the first end of the second inductor, and opposing ends of the auxiliary primary winding are coupled between the first and second diodes of the first and second branches, respectively.

6. The system of claim 1, the output circuit comprising first and second secondary windings coupled in series, opposing ends of the secondary windings coupled to the first output terminal, and a center tap between the secondary windings coupled to the second output terminal.

7. A power conversion system comprising: first and second switching elements coupled in series across first and second power input terminals; an LLC resonant circuit coupled between the first and second switching elements and comprising a first inductor, a primary winding of a transformer, and one or more resonant capacitors; an output circuit comprising one or more secondary transformer windings, and a bulk capacitor coupled across first and second output terminals; a voltage sensor; a hold-up time enhancement circuit comprising an auxiliary secondary winding of the transformer coupled in series with a second inductor and a third switching element; and a controller coupled to the voltage sensor and effective to determine a hold-up time condition based on a voltage across the voltage sensor, wherein the controller is further effective in a first operating mode associated with a normal condition to generate switch driver signals to turn OFF the third switching element and disable the hold-up time enhancement circuit, the controller is further effective in a second operating mode associated with a hold-up time condition to generate switch driver signals to turn ON the third switching element and enable the hold-up time enhancement circuit to maintain an output voltage across the first and second output terminals at or above a threshold for a period of time during the hold-up time condition, and the hold-up time enhancement circuit is not coupled across the first and second output terminals.

8. The system of claim 7, wherein the auxiliary secondary winding is coupled on a first end to the second inductor and on a second end to the second output terminal, further wherein the third switching element is coupled on a first end to the second inductor and on a second end to the second output terminal.

9. The system of claim 7, further comprising a fourth switching element coupled to the auxiliary secondary winding.

10. The system of claim 7, the hold-up time enhancement circuit further comprising a diode having an anode coupled to the second end of the second inductor and a cathode coupled to the first end of the third switching element.

11. The system of claim 7, the hold-up time enhancement circuit further comprising first and second diodes in each of first and second branches of a diode bridge, wherein the anodes of each of the first diodes are coupled to the second output terminal, the cathodes of each of the second diodes are coupled to the first end of the second inductor, and opposing ends of the auxiliary secondary winding are coupled between the first and second diodes of the first and second branches, respectively.

12. The system of claim 7, the output circuit comprising first and second secondary windings coupled in series, opposing ends of the secondary windings coupled to the first output terminal, and a center tap between the secondary windings coupled to the second output terminal.

13. A power conversion system comprising: first and second switching elements coupled in series across first and second power input terminals; an LLC resonant circuit coupled between the first and second switching elements and comprising a first inductor, a primary winding of a first transformer, and one or more resonant capacitors; a primary winding of a second transformer coupled in parallel with the primary winding of the first transformer; an output circuit comprising one or more secondary transformer windings of the first transformer and a bulk capacitor coupled across first and second output terminals; a voltage sensor; a hold-up time enhancement circuit further comprising a secondary winding of the second transformer as an auxiliary winding, a second inductor coupled on a first end to the auxiliary winding, and a third switching element coupled to a second end of the second inductor; and a controller coupled to the voltage sensor and effective to determine a hold-up time condition based on a voltage across the voltage sensor, wherein the controller is further effective in a first operating mode associated with a normal condition to generate switch driver signals to turn OFF the third switching element and disable the hold-up time enhancement circuit, and the controller is further effective in a second operating mode associated with a hold-up time condition to generate switch driver signals to turn ON the third switching element and enable the hold-up time enhancement circuit to maintain an output voltage across the first and second output terminals at or above a threshold for a period of time during the hold-up time condition.

14. The system of claim 13, wherein the auxiliary winding is coupled on a first end to the second inductor and on a second end to circuit ground, further wherein the third switching element is coupled on a first end to the second inductor and on a second end to circuit ground.

15. The system of claim 14, the hold-up time enhancement circuit further comprising a diode having an anode coupled to the second end of the second inductor and a cathode coupled to the first end of the third switching element.

16. The system of claim 15, the output circuit comprising first and second secondary windings coupled in series, opposing ends of the secondary windings coupled to the first output terminal, and a center tap between the secondary windings coupled to the second output terminal.

17. The system of claim 16, wherein the auxiliary winding is coupled on a first end to the second inductor and on a second end to the first output terminal, further wherein the third switching element is coupled on a first end to the second inductor and on a second end to circuit ground.

18. The system of claim 13, wherein the auxiliary winding is coupled on a first end to the second inductor and on a second end to the first output terminal.

19. The system of claim 13, the hold-up time enhancement circuit further comprising first and second diodes in each of first and second branches of a diode bridge, the anodes of each of the first diodes coupled to circuit ground, the cathodes of each of the second diodes coupled to the first end of the second inductor, and opposing ends of the auxiliary winding coupled between the first and second diodes of the first and second branches, respectively.

20. A power conversion system comprising: first and second switching elements coupled in series across first and second power input terminals; an LLC resonant circuit coupled between the first and second switching elements and comprising a first inductor, a primary winding of a transformer, and one or more resonant capacitors; an output circuit comprising one or more secondary transformer windings and a bulk capacitor coupled across a first output terminal and a second output terminal; a voltage sensor; a hold-up time enhancement circuit comprising a second inductor, an auxiliary secondary winding of the transformer coupled in series with the second inductor, a third switching element, and first and second diodes in each of first and second branches of a diode bridge, anodes of each of the first diodes coupled to the second output terminal, cathodes of each of the second diodes coupled to the second inductor, opposing ends of the auxiliary secondary winding coupled between the first and second diodes of the first and second branches, respectively; and a controller coupled to the voltage sensor and effective to determine a hold-up time condition based on a voltage across the voltage sensor, wherein the controller is further effective in a first operating mode associated with a normal condition to generate switch driver signals to turn OFF the third switching element and disable the hold-up time enhancement circuit, and the controller is further effective in a second operating mode associated with a hold-up time condition to generate switch driver signals to turn ON the third switching element and enable the hold-up time enhancement circuit to maintain an output voltage across the first and second output terminals at or above a threshold for a period of time during the hold-up time condition.

21. A power conversion system comprising: first and second switching elements coupled in series across first and second power input terminals; an LLC resonant circuit coupled between the first and second switching elements and comprising a first inductor, a primary winding of a transformer, and one or more resonant capacitors; an output circuit comprising first and second secondary transformer windings coupled in series and a bulk capacitor coupled across a first output terminal and a second output terminal, opposing ends of the secondary transformer windings coupled to the first output terminal, the secondary transformer windings including a center tap coupled to the second output terminal; a voltage sensor; a hold-up time enhancement circuit comprising a second inductor, an auxiliary secondary winding of the transformer coupled in series with the second inductor and a third switching element, the auxiliary secondary winding coupled on a first end to the second inductor and on a second end to the first output terminal, the third switching element coupled on a first end to the second inductor and on a second end to the second output terminal; and a controller coupled to the voltage sensor and effective to determine a hold-up time condition based on a voltage across the voltage sensor, wherein the controller is further effective in a first operating mode associated with a normal condition to generate switch driver signals to turn OFF the third switching element and disable the hold-up time enhancement circuit, and the controller is further effective in a second operating mode associated with a hold-up time condition to generate switch driver signals to turn ON the third switching element and enable the hold-up time enhancement circuit to maintain an output voltage across the first and second output terminals at or above a threshold for a period of time during the hold-up time condition.

* * * * *